United States Patent [19]

Flament

[11] Patent Number: 5,048,764
[45] Date of Patent: Sep. 17, 1991

[54] APPARATUS FOR COMMINUTING SOLID WASTE

[76] Inventor: Gregory J. Flament, P.O. Box 2261, Dunedin, Fla. 34296

[21] Appl. No.: 554,249

[22] Filed: Jul. 18, 1990

Related U.S. Application Data

[63] Continuation-in-part of Ser. No. 432,198, Nov. 6, 1989, abandoned, which is a continuation-in-part of Ser. No. 424,869, Oct. 20, 1989, abandoned.

[51] Int. Cl.$^5$ .............................................. B02C 18/18
[52] U.S. Cl. ...................................... 241/36; 241/222; 241/236; 241/295; 241/DIG. 31; 241/DIG. 38
[58] Field of Search .............. 241/DIG. 38, DIG. 31, 241/36, 236, 166, 167, 295, 30, 222

[56] References Cited

U.S. PATENT DOCUMENTS

| | | | |
|---|---|---|---|
| 4,046,324 | 9/1977 | Chambers | 241/236 X |
| 4,165,043 | 8/1979 | Higashi et al. | 241/236 |
| 4,709,197 | 11/1987 | Goldhammer et al. | 241/36 X |

FOREIGN PATENT DOCUMENTS

| | | | |
|---|---|---|---|
| 18722 | 4/1914 | Denmark | 241/236 |
| 2831953 | 12/1979 | Fed. Rep. of Germany | 241/295 |

*Primary Examiner*—Mark Rosenbaum
*Attorney, Agent, or Firm*—Walter J. Monacelli

[57] ABSTRACT

Apparatus for crushing, grinding and shredding solid waste material in which two interacting stacks of cutting and shredding elements are positioned on two substantially parallel shafts and mounted transversely with respect to the directions of waste material fed into the apparatus. Cutting members on one stack interact with cutting members on the other stack. In each stack adjacent cutting members are spaced from each other by a spacer. The spacers in the apparatus differ from those used in prior comminutors of this type in that they also have cutter elements on their periphery and thereby serve as cutters or shredders as well as spacers. This double function of the spacers increases the efficiency of the comminuting apparatus. Most importantly there are cutting edges from the bottom to the top of each stack so that there are no intermediate elements on which strings or wires can be wrapped without encountering a cutting edge. While this is important in the shredding of relatively soft or easily shredded material, this is even more important in the comminuting of tires which have been reinforced with nylon cord or steel wire which have a tendency to wind around sections not having cutting edges. The process of effecting the difficult task of comminuting automobile and truck tires is also described.

29 Claims, 5 Drawing Sheets

APPARATUS FOR COMMINUTING SOLID WASTE

This application is a continuation-in-part of copending U.S. Pat. application Ser. No. 07/432,198 filed Nov. 6, 1989, which is a continuation-in-part of U.S. Pat. application Ser. No. 07/424,869, filed Oct. 20, 1989, now abandoned.

BACKGROUND OF THE INVENTION

1. Field of the Invention

The invention relates to apparatus for crushing and shredding of solid waste material. More specifically it relates to apparatus in which two stacks of cutting and shredding elements are arranged on two substantially parallel shafts with spacers positioned between each pair of adjacent cutters on each shaft. Still more specifically it relates to such apparatus in which said spacers have cutting elements on their peripheries and serve also as cutters as well as spacers thereby increasing the efficiency of the comminuting apparatus. Still more specifically it relates to comminuting apparatus which has cutting edges from the bottom to the top, or from one end to the other end of the comminuting elements without any intermediate elements having no cutting edges whereby strings or wires in the waste material might be wound without meeting cutting edges.

2. State of the Prior Art

Various types of solid waste material have been the object for comminution in various types of apparatus. The comminuted material may be used for various purposes or used as land fill.

Recently there has been interest in comminuting discarded tires. Huge piles of tires have accumulated in various areas which present fire hazards. Once a pile of tires catches fire, either accidentally or intentionally to dispose of the tires, the burning is difficult to extinguish and the combustion fumes or products are very damaging to the environment.

To dispose of these discarded tires attempts have been made to use them in land fill. One practice is to deposit garbage and solid waste to a depth of 5 feet or more and then a layer of comminuted tires is imposed. Over this layer of comminuted tires there needs to be placed a layer of dirt to a depth of 4 inches or more.

In the comminution of tires the nylon cord or steel wire reinforcement used in most tires has a tendency to wrap around any rotating elements that may be in the comminuting apparatus. Therefore apparatus of increased efficiency for cutting these cords or wires is desired. Moreover heavy truck tires have a steel bead sometimes 0.5 in diameter running on the inside rim of the tires which presents a drastic challenge to the comminuting capability of the apparatus.

The interest in devices for comminuting waste material is evidenced by the number of patents granted for this purpose, for example, U.S. Pat. Nos. 1,477,502; 3,151,645; 3,529,782; 3,664,592; 3,695,520; 3,738,582 and 4,046,324.

U.S. Pat. No. 4,046,324 describes two vertically arranged shafts. The cutters in each column are separated from each other by spacers which have a smaller diameter than the diameter of the cutters and which provide enough space between two adjacent cutters to allow a cutter from the other stack to enter a portion of the space between the cutters on the first stack.

U.S. Pat. No. 85,067 shows apparatus for cutting straw involving a number of circular saw blades designed to cut the straw or similar fiber material. The saw blades are spaced from each other by spacers and have different diameters. A large diameter saw blade on one shaft is meshed between two blades of smaller diameter on the other shaft. Between each two large diameter saw blades there are two small diameter saw blades and each is separated from adjacent saw blades by spacers.

U.S. Pat. No. 219,170 describes circular saw blades used to disintegrate paper stock with blades of large diameter on one shaft and blades of smaller diameter on a second shaft. There is no indication of the blades meshing and the blades are separated from adjacent blades by washers or spacers.

In applicant's parent U.S. Pat. application Ser. No. 07/432,198, the following references were cited:
U.S. Pat. Nos. 4,046,324; 4,165,043; 4,709,197; 4,609,155; West German Pat. No. 2,831,953; Japanese Pat. No. 52,269; British Pat. No. 2,026,342 and Danish Pat. No. 18,722.

None of the prior art references show cutting edges throughout the height or length of the comminuting element. Therefore it is possible for waste material of a stringy type to become wrapped around the spacers. In some cases the build-up of wrapped stringy material has been reported to push apart the stacks of cutting elements.

The above-cited devices are shown capable of performance on easily comminuted materials, such as straw, sewage, etc. None of these have been shown capable of comminuting tires which are difficult to comminute and which have nylon or steel wire reinforcement therein and particularly huge truck tires which have a steel bead of about 0.5 inch diameter running along the inside rim of the tires.

The disposal of tires has become a major problem in most areas of the United States. It is estimated that approximately 250 million tires are discarded each year. These present environmental and ecological problems. Each tire gives an average of approximately 1.5 gallons of oil and 6 cubic feet of combustible gas. The amount of combustible materials therein present the danger of catching fire and difficulty in subduing the fires. In addition to the combustible nature of the material, piles of tires are often so high and of such considerable area that it is difficult to attack the fire in such piles. Attempts have been made to use tires without comminution in land fill. When the tires are used as such with trash and garbage, the tires eventually work their way to the surface. It is found necessary therefore to comminute the tires before using in land fill.

A number of states have passed legislation regulating the disposal of tires. For example, Florida, where approximately 17 million tires accumulate per year, has legislated that a disposal fee of one dollar per tire is to be paid upon the purchase of new tires. Eighty percent of the funds thus collected goes back to the respective counties for the purchase and maintenance of tire shredding equipment. These shredders, generally of the hammermill type cost approximately $175,000 or more each. This state regulates that shredded tires having no pieces of more than 2 inches in its greatest dimension may be used as land fill.

In the general practice of land fill, garbage must be covered at the end of each day with a layer of at least 6 inches of dirt and then treated with a stabilizer or hardening material so that by the next day the dumping trucks will be supported on this surface. However when a covering of two inches of comminuted rubber and four inches of dirt is used, the surface layer is sufficiently stabilized to support the trucks. This state also has anti-littering law which punishes a person found throwing away tires of 45 pounds or more by a fine and possible confiscation of the person's vehicle. With more states growing more conscious of the necessity of regulating tire disposal, the development of more efficient equipment and processes for the comminution of tires becomes a very important factor.

OBJECTIVE

It is an object of this invention to improve the efficiency of comminuting apparatus for the grinding, shredding and cutting of solid waste material.

It is also an object of this invention to avoid the wrapping of waste material around the spacer elements in comminuting apparatus.

It is also an object of this invention to improve the efficiency of comminuting apparatus so that it may be made capable of performing more difficult tasks such as the comminuting of automobile and truck tires.

It is also an object of this invention to have the spacer elements in comminuting apparatus to serve a double function, namely, a cutting function as well as the spacing function.

It is also a special object of this invention to design equipment capable of comminuting tires having reinforcing cord or wire therein.

It is also an object of this invention to design such tire comminuting equipment to avoid the wrapping of the reinforcing cord or wire around elements in the comminuting apparatus not having cutting edges.

It is also an object of this invention to design comminuting equipment capable of comminuting truck tires having steel rim beads of approximately 0.5 inch in thickness.

Other objects will become obvious upon reading the detailed description of the invention as given hereinafter.

STATEMENT OF THE INVENTION

In accordance with these objects the apparatus of this invention has been designed for improved efficiency in crushing, grinding and shredding solid waste material. In this apparatus two interacting stacks of cutting and shredding elements are positioned on substantially parallel shafts and mounted transversely with respect to the direction of waste material fed into the apparatus. In each such stack, adjacent cutting members are spaced from each other by a spacer. An important novel feature of the apparatus of this invention is that these spacers have cutting elements at their peripheries and thereby serve as cutters as well as spacers. These spacer-cutter elements reduce and in most cases completely eliminate the winding of waste material that normally accumulate around the spacers. Moreover the presence of these cutting elements on the spacers greatly improves the cutting and grinding efficiency of this apparatus and makes it capable of performing more difficult grinding and shredding operations such as the grinding and shredding of automobile and truck tires, in which latter cases an increase in the size of the cutters may be advantageous.

When tires are to be comminuted by the apparatus and process of this invention a novel feeding apparatus has been designed in which the tires are laid horizontally on the rollers of a conveyor system. The conveyor system initially has two sets of horizontal rolls, preferably with a downward slope to the conveyor so that by the force of gravity the tires will move downward and along the conveyor. One set of these rollers is gradually converted from its horizontal position to a vertical position so that the tires are turned from their sidewall side to their outer circular, tread side. This represents the narrowest width of the tire which is the preferred manner of feeding the tires in between the two rotating stacks of cutters. Any other manner of feeding will present problems in the comminution. This device facilitates the feeding of tires into the comminutor regardless of whether the shafts for the stacks of cutters extend vertically or horizontally. Moreover this conveyor system keeps the operator at a greater distance from the comminutor and reduces the possibility of accidents.

The dimensions of the cutters and spacer cutters may be varied somewhat in accordance with the waste material being processed. The size and shape of the teeth may also be varied somewhat in accordance with the desired results. The conditions of operation in the cutting and grinding may be varied in many ways, for example, the speed of rotation of the elements, the use of fluid for transporting material to, through and from the apparatus, periodic reversal of direction of rotation of the grinding and cutting elements, etc.

The shafts on which the cutters and spacers are arranged may have cross-sections of various shapes such as hexagonal, square, rectangular, triangular, etc. The hexagonal shape is preferred. Shafts of circular cross-section may be used with one or more slots for keys to be inserted in the slots to prevent the cutters and spacers from slipping or sliding on the shafts. Also circular cross-sections with one or more projections thereon could also be used. However, such circular shafts would offer more problems than the other shapes mentioned. The cutters and spacers have corresponding openings in their centers so that they can be fitted onto the shafts, preferably with the centers of the cutters and spacers coinciding with the linear or longitudinal axis of the shaft on which they are assembled.

The shafts are advantageously operated at different speeds and at appropriate times are counter-rotated and reversed in direction to give maximum cutting and shearing action.

The apparatus of this invention can be used on various types of waste material. This may be fluid material either heavily or lightly loaded with solid material. It may also be dry solid material. A number of such cutting apparatus units may be used together either in series or parallel arrangement. In most cases the apparatus is set up so that the shafts are in vertical position with the flow of waste material being effected horizontally through the cutters entering at one side of the apparatus and exiting from the opposite side. In other cases, particularly when the waste material is dry, the shafts may be positioned horizontally and the waste material fed into the cutters by gravity flow. It is also possible to feed dry material into the cutter arrangement on vertical shafts by using a chute or a conveyor belt to feed the dry material.

In a preferred arrangement, a motor is positioned above the vertically arranged shafts and rotary force transmitted to one of the shafts. This is referred to as the drive shaft. Gears are positioned above the two shafts so that the two shafts are rotated at different speeds and in opposite directions, one being rotated clockwise and the other counterclockwise. Preferably the drive shaft is rotated at 60 revolutions per minute (RPM) and the driven shaft is rotated at 30 RPM. One way to effect this is with a motor giving 1750 RPM and a gear reduction of 29 to 1.

The motor can be equipped so that when the cutters are jammed or over-worked by an object or piece difficult to cut, the rise in the ampere reading will effect a reversal of the motor's direction of rotation and with it the direction of rotation of the cutters. This is effected on a control panel (not shown). Then after a short period the motor will be turned back to its original rotation. If there is still jamming or over-working to reach the same level of ampere reading the reversal procedure will be repeated. This backward and forward procedure may be repeated a certain number of times and if the problem is not cured by a certain number of repetitions, an alarm may be sounded and/or the apparatus shut down until an attendant can clear the apparatus.

If the teeth on the cutters show wear, it is possible to disconnect the apparatus, turn the apparatus 180° and reverse the leads in the motor so the cutters will rotate in the opposite directions. This makes it possible to use both sharp cutting edges on the cutting elements.

It is preferred to have the teeth on the cutters arranged in vertical lines parallel with the axis of the shafts. However where desired it is also possible to have these teeth in a spiral or helical arrangement around the shaft. This can be done by having the hexagon of the cutter turned and positioned one sixth of the hexagon from the cutter just previously positioned on that shaft.

The cutting apparatus of this invention can be inserted in an arrangement with pipes through which fluid waste material is or will be flowing. In such case flanges are provided on two sides of the apparatus so that flow will be through the apparatus preferably through the lowest of the cutters and through a substantial number of cutters. The size of pipe and the size of the flanges and openings provided will vary in accordance with the type and amount of material to be processed through the apparatus. In other cases the apparatus may be set in a channel along which the waste material is flowing. In such case, flanges need not be provided but it is desirable to have the flow of fluid restricted so that it must flow through the apparatus.

SPECIFIC EMBODIMENTS OF THE INVENTION

The description of the invention is facilitated by reference to the drawings.

Figure 1:
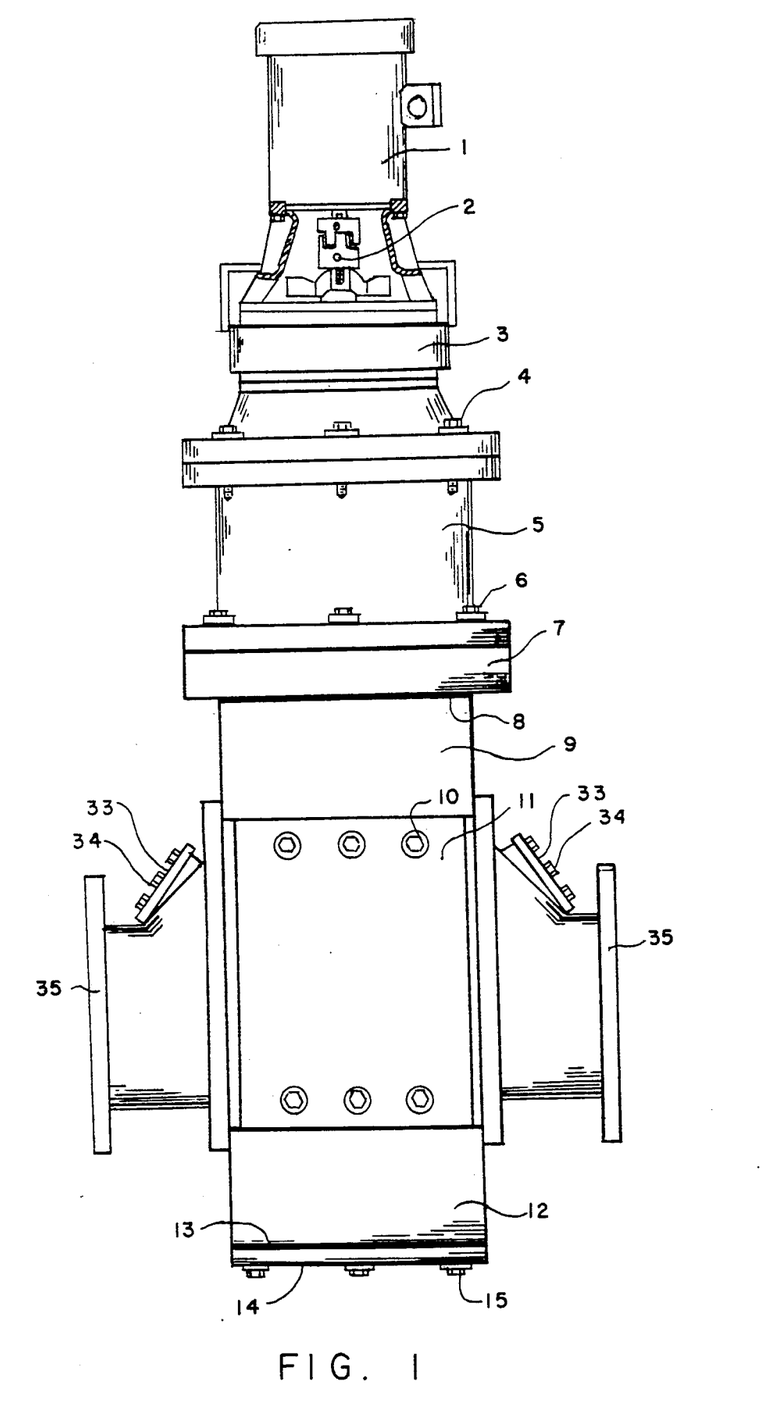
FIG. 1 is a side view of a preferred modification of the apparatus of this invention with a motor, jaw coupling and gear reducer mounted on top.

The side view of FIG. 1 shows motor 1, jaw coupling 2 and gear reducer 3 mounted on top of the reducer adapter 5 by bolts 4 and the reducer adapter 5 is attached to housing adapter 7 by bolts 6. Housing adapter 7 is positioned above and fastened to top housing 9 with bolts 6 and top gasket 8 to effect a tight seal. Side rail 11 is fastened to the housing by bolts 10. Flanges 35 are provided so that the apparatus may be connected in a pipe line through which a fluid carrying solid waste is flowing. Coverplates 33 are fastened by bolts 34 to cover cleanout openings. Bottom cover plate 14 is bolted by bolts 15 to bottom housing 12 with bottom gasket 13 to effect a seal.

Figure 2:
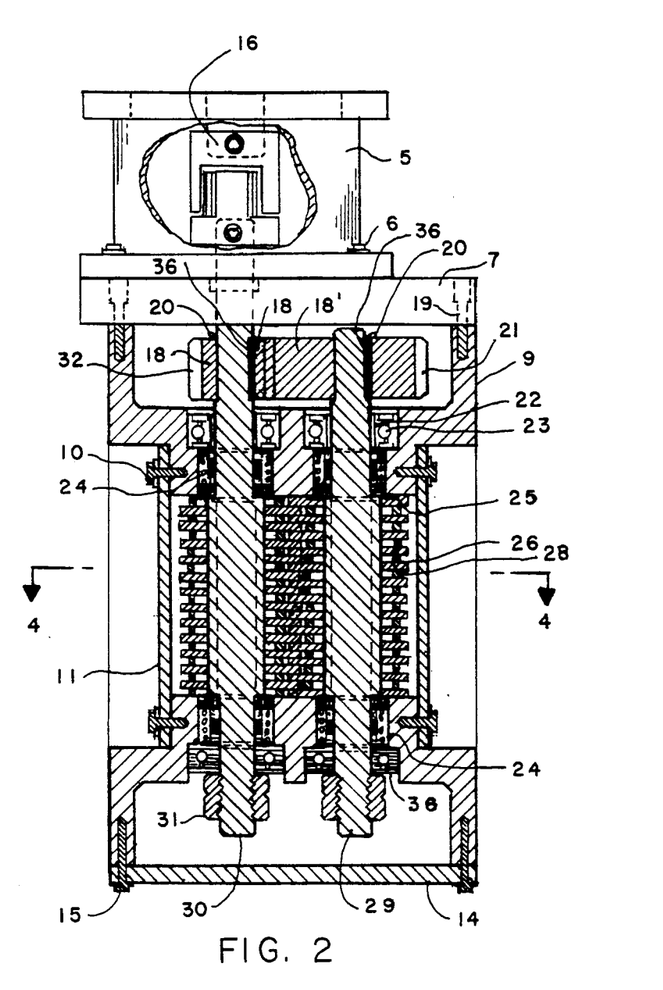
FIG. 2 is a front view of the apparatus of FIG. 1 with the motor, jaw coupling and gear reducer removed from the top of the apparatus with a cross-section taken vertically at the middle of the apparatus going downward starting with the top housing and an open section shown in the upper part of the apparatus.

In the front, partial cross-sectional view of FIG. 2, jaw coupling 16 is shown inside reducer adapter 5. The cross-sectional view is taken downward at the middle of the apparatus starting from just above the gears 18 and 18'. Gear 18 is locked onto shaft 30 by key 36 and is driven by driving shaft 30 and gear 18 has teeth 32 which engage gear teeth 21 to rotate driven shaft 29. With a gear ratio of 15 teeth in gear 18 and 30 teeth in gear 18' the speed of driven shaft 29 is considerably reduced from that of driving shaft 30. Various other ratios may be used.

Figure 3:
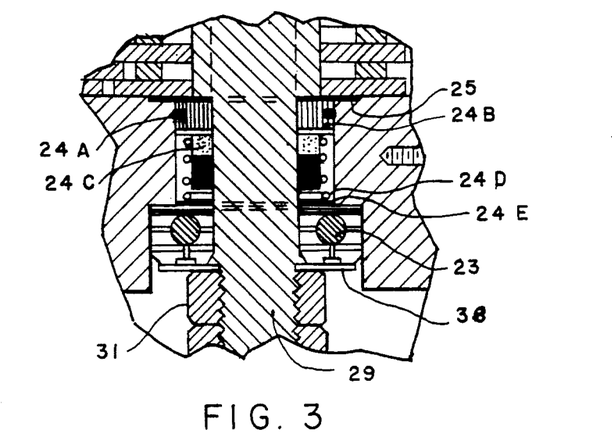
FIG. 3 is an enlarged view of the seal assembly portion at the bottom of the driven shaft in FIG. 2.

In the blow-up shown in FIG. 3 the seal assembly area is identified as 24 in FIG. 2. The seal assembly is positioned below flat washer 25. This assembly comprises O-ring 24A, mating ring 24B, primary sealing ring 24C, spring 24D, and spring holder 24E. Bearing 23 is positioned below spring 24D, and above flat washer 38 which is retained in position by nut 31.

Figure 4:
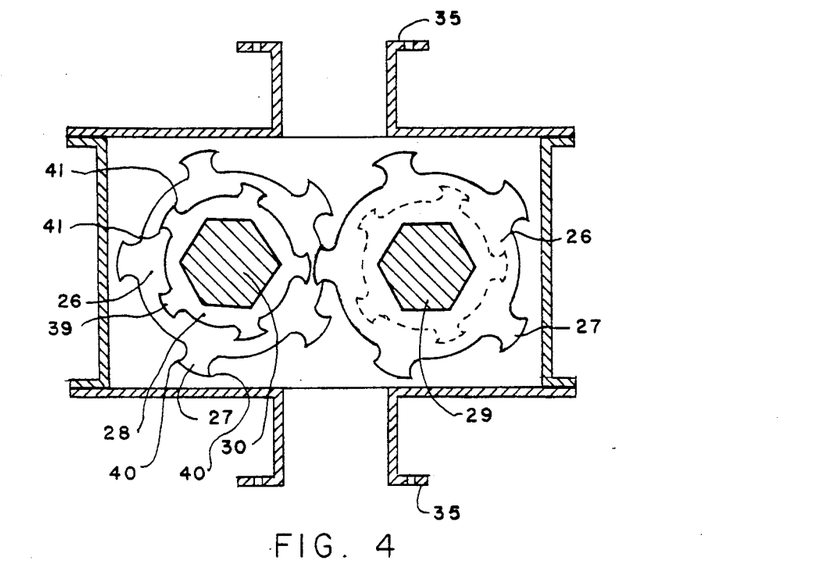
FIG. 4 is a cross-sectional view of the cutters and spacer-cutters portion of FIG. 2 taken at line 4—4.

In the cross-section shown in FIG. 4, cutter 26 on driving shaft 30 has teeth 27 and cutting edges 40. Above this cutter 26, spacer-cutter 28 is shown with teeth 39 and cutting edges 41. The opposite cutter 26 driven on driven shaft 29 is on approximately the same level as spacer-cutter 28 on the other shaft. The cutter on the driven shaft also has teeth 27. A spacer-cutter on this side is shown below the cutter by dotted lines. The flanges 35 provide a means for connecting the apparatus into a pipe system carrying a solid waste-bearing fluid.

Figure 5:
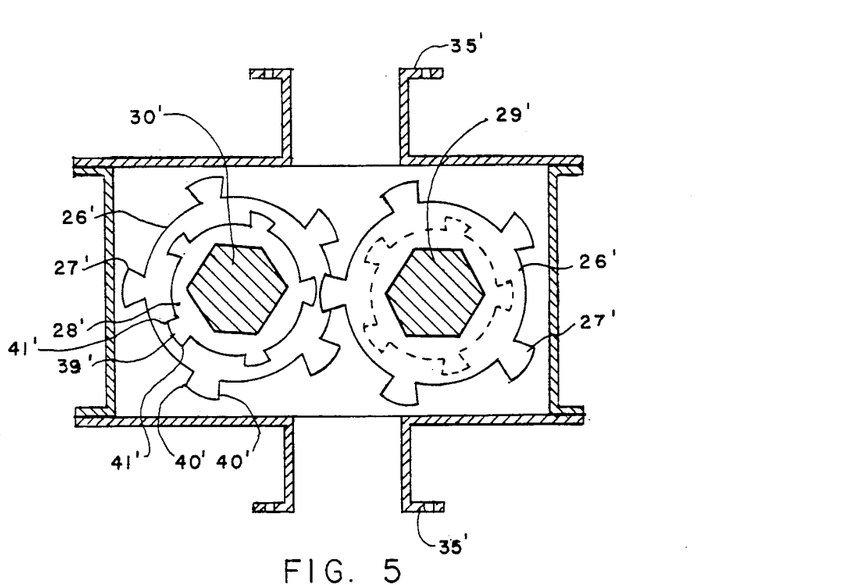
FIG. 5 is a similar cross-sectional view as shown in FIG. 4 in which the cutting elements of the cutters and of the spacer-cutters have a different shape from that shown in FIG. 4.

FIG. 5 is a similar view of apparatus in which the teeth on both the cutter and the spacer-cutter have flat side surfaces instead of the concave side surfaces shown in FIG. 4. In FIG. 5, the cutter is 26' with teeth 27' and cutting edges 41'; the shafts are 30' and 29' respectively; the spacer-cutter is 28' and its teeth are 39' with cutting edges 40'; and the flanges are 35'.

Figure 6:
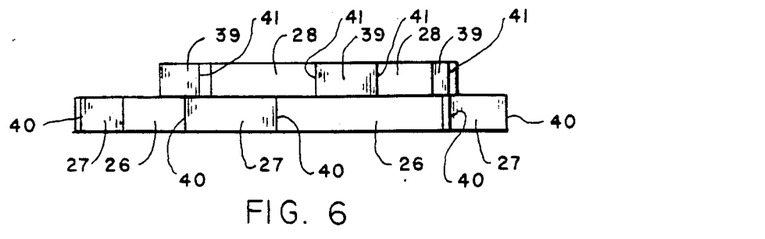
FIG. 6 is a side view of a cutter with a spacer-cutter positioned thereon.

In FIG. 6 the side view of cutter 26 has three teeth 27 showing with cutting edges 40. Positioned on the cutter is spacer-cutter 28 also with three teeth 39 showing with cutting edges 41.

Figure 7:
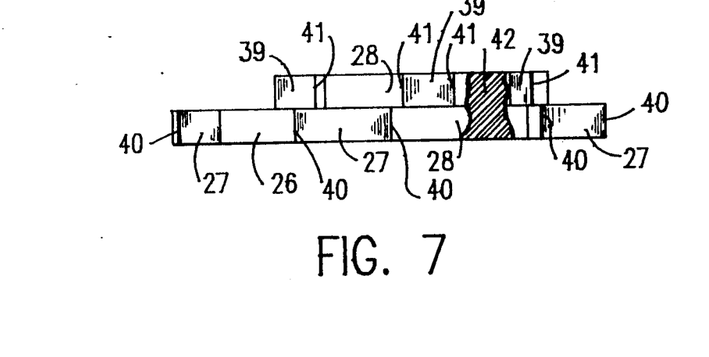
FIG. 7 is a side view of a combination of a cutter and a spacer-cutter in one integral piece with a cut-away section showing the integral structure.

The cutter—spacer-cutter combination may be provided in one integral unit as shown in FIG. 7 where broken section 42 shows this structure. Such units may be stacked to provide the desired arrangements of cutters and spacer-cutters. Where it is desired to have a cutter at both the top and bottom of the stack, an individual cutter disk may be added to the stack in any appropriate arrangement. Or where it is desired to have a spacer-cutter at both the top and bottom of the stack, the unit as shown in FIG. 7 may be inverted and an individual spacer-cutter may be added in any appropriate arrangement.

Figure 8:
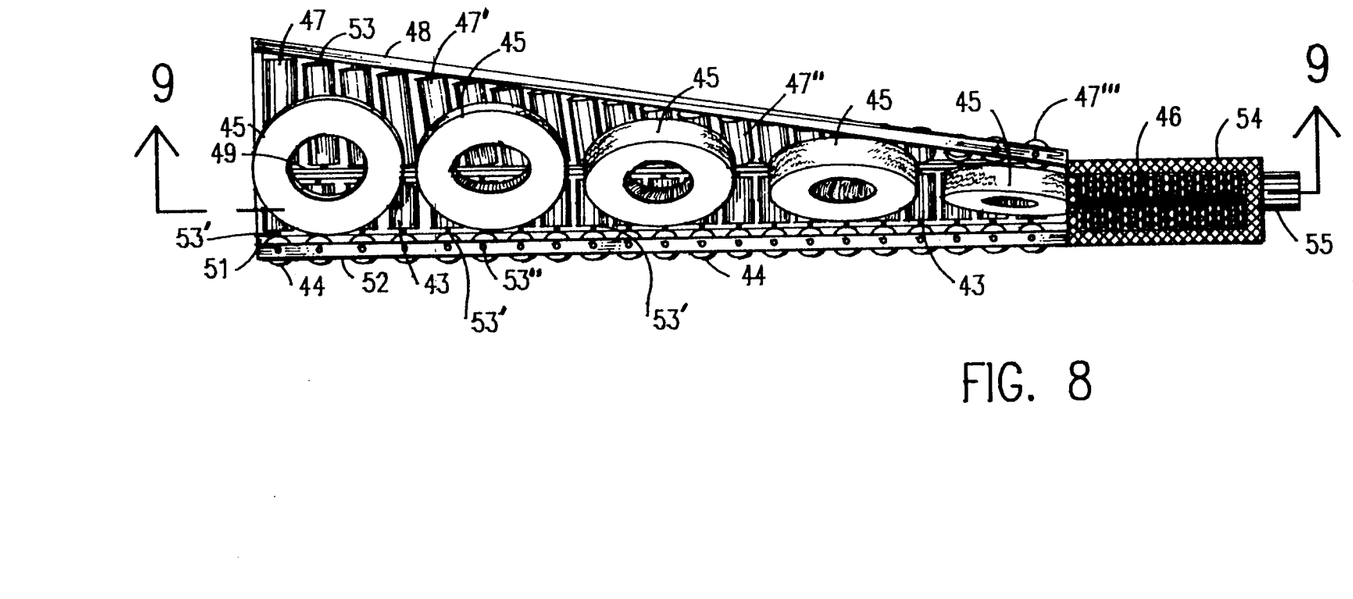
FIG. 8 is a top view of a roller conveyor system for feeding tires into the comminutor.
Figure 9:
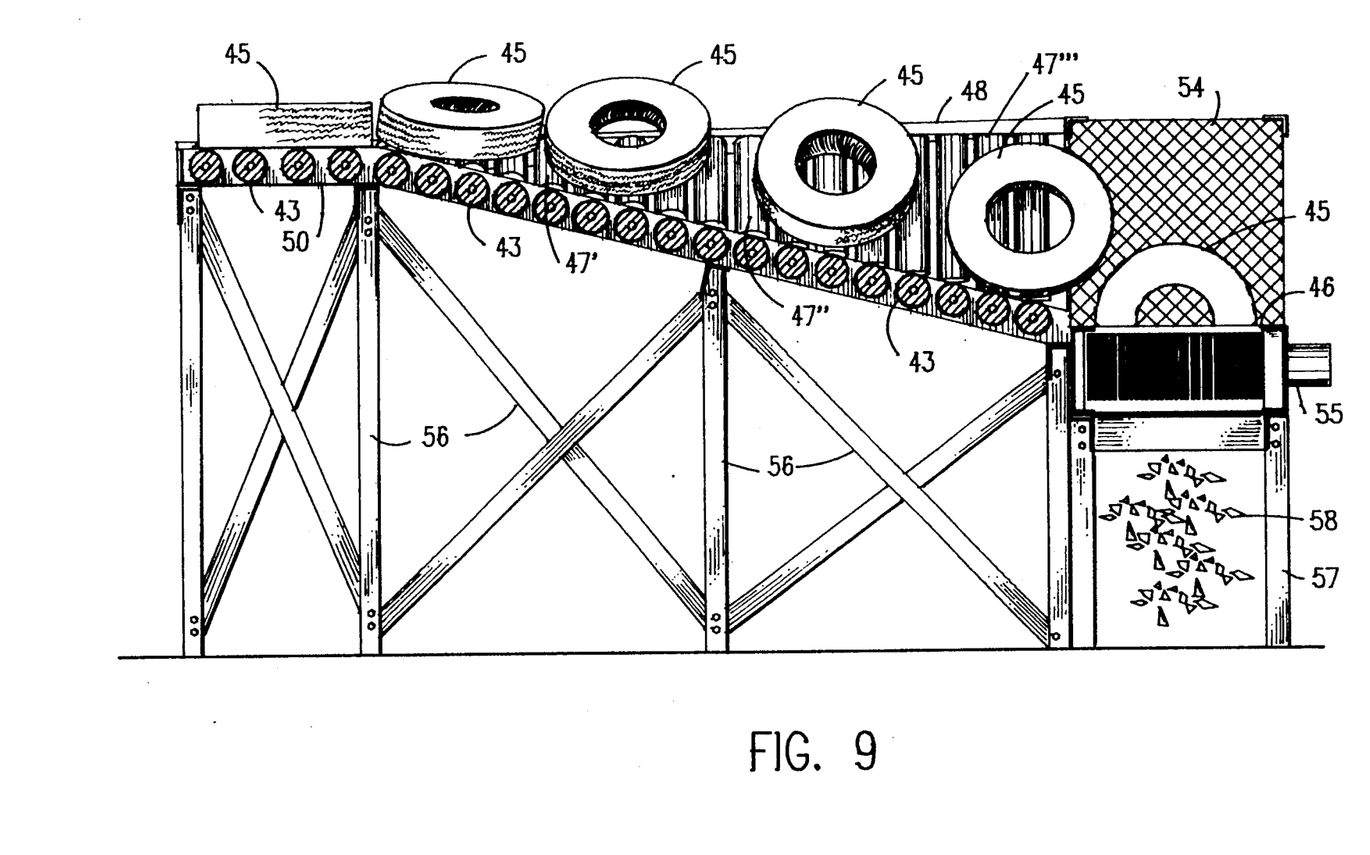
FIG. 9 is a side elevational view of the conveyor system of FIG. 8 taken at line 9—9.

FIGS. 8 and 9 show a preferred roller conveyor system capable of feeding tires into the grinder or comminutor. This has the advantage of keeping the operator at a safe distance from the grinder thereby reducing the possibilities of accidents. The conveyor system consists of three sets of rollers. Rollers 43 are positioned horizontally. The length of rollers 43 is advantageously ½ or even less than the diameter of the tires. Advantageously at least at the end of the conveyor adjacent to the grinder, rollers 43 each have a length no greater than the width of the thread surface of the largest tire to be comminuted. Also one or two guiderails (not shown) may be inserted above the grinder to receive the tires when smaller tires are being fed into the system. Rollers 44 are placed vertically and are used to prevent the tires from falling off of rollers 43 and also to guide the tires 45 into the grinder. Side rollers 47 are initially horizontal and then are turned gradually as shown as 47' and 47" in an intermediate position toward vertical and then eventually in a vertical position as shown by rollers 47'''. Support 48 for rollers 47, 47', 47" and 47''' is curved or twisted to accommodate these changes in positioning of the rollers and support 49 holds the other end of the spindles 53 for these same rollers. Supports 50 and 51 hold the spindles 53' for rollers 43 and support 52 holds the spindles 53" for rollers 44. Grating 54 is provided as protection in the area above grinder 46 and may be removed in the event work needs to be done on the grinder preferably when the driving mechanism 55 is shut off. Support system 56 is used to support the conveyor system. Supports 57 are provided to support the grinder 46 in a raised position so that a movable bin or container (not shown) may be positioned under the grinder to collect the chips 58 delivered from the grinder.

This conveyor system is shown with the opposite end raised with respect to the end adjacent to the grinder so as to have the tires move along by gravity. It is also contemplated that a motor driven belt conveyor may be used in place of the middle series of rollers.

While the conveyor system of FIGS. 8 and 9 is preferred and is considered novel, other conveyor systems or chutes may be used to deliver tires to the grinder or under very careful conditions the tires may be delivered directly or dropped into or to the grinder.

With the cutter—spacer-cutter arrangement of this invention there is a maximum use of cutter facilities. There are no washers or spacers (without teeth) between teeth bearing elements. Consequently the full length or height of the cutting part of this apparatus is used in the comminuting function.

For most standard units the preferred dimensions for various parts of the apparatus are: cutter outside diameter (including teeth) 4.75" to 6.0"; cutter-spacer outside diameter (including teeth) 3.25" to 4.5"; inside diameter of both cutters and spacer-cutters 2" hexagon (distance from one flat side to the opposite flat side); thickness of cutter 0.220" to 0.500"; thickness of spacer-cutter 0.230" to 0.520"; thickness of teeth preferably same as cutter or spacer-cutter to which attached. Generally the teeth extend about 0.5 inch from the main body portion of the cutter or spacer-cutter and have a width (in the outer circumference) of about 0.25" to 0.50". Also the clearance between a cutter on one shaft and a cutter-spacer on the other shaft is about 0.0625" to 0.25".

Larger industrial units, such as for comminuting tires, have corresponding dimensions of:cutter outside diameter 14" to 16"; cutter inside opening of 4" to 8" hexagon and cutter thickness of 1.75" to 3.00"; and spacer-cutter outside diameter of 7" to 10"; inside opening of 4"–8" hexagon; and thickness of 1.9" to 3.1"; and clearance between a cutter on one shaft and opposing spacer-cutter on the other shaft of about 1.5" to 4.0".

It is desirable to have clearance between overlapping cutters of at least 0.01 inch. This is achieved by using spacer-cutters with a slightly larger thickness than that of the cutters However it is desirable to have a minimum of open space in the comminuting chamber, that is around and between the cutter and spacer-cutter blades and between the cutting apparatus and the surrounding casing wall.

The integral cutting unit as shown in FIG. 7 has a first substantially circular section and a second substantially circular section, each of the substantially circular sections having teeth extending radially from the outer periphery of the circular section, these teeth having cutting means or edges thereon, the diameter of the second circular section being substantially smaller than the diameter of the first circular section and sufficiently smaller so that the teeth extending from the outer periphery of the second circular section do not extend beyond the outer periphery of the first circular section, the integral cutting unit having an opening, preferably hexagonal, at the center thereof passing through both the first and second substantially circular sections and concentric with the first and second substantially circular sections, this opening having a size and shape suitable for mounting on a shaft whereby the unit will be capable of being rotated about its center upon rotation of this shaft about its longitudinal axis. This integral cutting unit has a thickness in the second substantially circular section slightly greater than the thickness of the first substantially circular section, preferably at least 0.01 inch greater.

While certain features of this invention have been described in detail with respect to various embodiments thereof, it will of course be apparent that other modifications can be made within the spirit and scope of this invention, and it is not intended to limit the invention to the exact details insofar as they are defined in the following claims.

The invention claimed is:

1. Apparatus for comminuting solid waste material comprising:
   (a) a casing defining therein a comminution compartment with inlet and outlet ports disposed on opposite sides of said comminution compartment and adapted for the flow of solid waste therethrough;
   (b) a first shaft and a second shaft, said first and second shafts each having an upper region and said shafts being substantially parallel to each other and positioned in said comminution compartment;
   (c) an arrangement of cutters mounted on said first shaft the cutters on said first shaft being adapted to be rotated upon the rotation of said first shaft upon its linear axis and said cutters on said first shaft being spaced from each adjacent cutter on the said first shaft;
   (d) an arrangement of cutters mounted on said second shaft, the cutters on said second shaft being adapted to be rotated upon the rotation of said second shaft upon its linear axis and said cutters on said second shaft being spaced from each adjacent cutter on the said second shaft, the spacing of the cutters on the respective shafts being such that the cutters on one shaft can be overlapped with the cutters on the other said shaft, with the spacing of said first shaft from said second shaft being appropriate to permit such overlapping;

(e) an arrangement of spacer-cutters mounted between the respective cutters on the said two shafts, one spacer-cutter being positioned between each pair of adjacent cutters on each respective shaft, each spacer-cutter comprising a spacer means to provide the appropriate space between adjacent cutters to allow the overlapping of a cutter in one said cutter arrangement with a cutter in the other said shaft arrangement and each spacer means having cutting means positioned on the periphery of said spacer means;

(f) the said cutters and said spacer-cutters each having cutting means thereon which is capable of cutting regardless of the direction of rotation of the said cutters or said spacer-cutters; and (g) a driving means for providing rotational force to said first shaft and said second shaft, said second shaft being driven in a direction opposite to the rotational direction of said first shaft.

2. The apparatus of claim 1 in which said arrangements of cutters and spacer-cutters on said first and second shafts are arranged continuously from one linear end to the other linear end of each said arrangement whereby there are no spaces free of cutters in the length of each said arrangement on which spaces strings can be wound.

3. The apparatus of claim 2 in which said driving means applies the rotational force to said first shaft and said first shaft transmits rotational force to said second shaft through a pair of meshing gears.

4. The apparatus of claim 3 in which said meshing gears have a different number of teeth in the respective gears whereby the said first shaft and said second shaft are rotated at different rates of speed.

5. The apparatus of claim 3 in which said driving means applies rotational force to said first shaft, said first shaft has affixed thereto one of said pair of meshing gears and is capable of rotating said meshing gear, said second shaft is affixed to the other of said pair of meshing gears whereby upon the meshing of said two gears the rotation of said first shaft will effect the rotation of the second shaft in the opposite rotational direction.

6. The apparatus of claim 5 in which said meshing gears have a different number of teeth in the respective gears whereby the said first shaft and said second shaft are rotated at different rates of speed.

7. The apparatus of claim 6 in which each of said cutters comprises a disc having teeth protruding radially from the periphery of said disc, said teeth having cutting edges thereon.

8. The apparatus of claim 7 in which each of said spacer-cutters comprises a disc of smaller diameter than the disc of said cutter, said spacer-cutter discs having teeth protruding radially from the periphery thereof, said teeth having cutting edges thereon.

9. Apparatus for comminuting solid waste material comprising:

(a) a casing defining therein a comminution compartment with inlet and outlet ports disposed on opposite sides of said comminution compartment from each other and adapted for the flow of solid waste therethrough;

(b) a comminutor assembly comprising substantially parallel first and second stacks of cutter elements mounted on first and second substantially parallel shafts, each of said shafts having an upper region, with the cutter elements on said first shaft spaced from each adjacent cutter elements on said first shaft, and the cutter elements on said second shaft spaced from each adjacent cutter element on said second shaft, the spacing between the respective cutter elements being appropriate for the overlapping of the cutter elements on said first shaft with the respective cutter elements on said second shaft, each cutter element on said first and second shafts being separated from adjacent cutter elements by spacer-cutter elements, said cutter elements and said spacer-cutter elements each comprising a disc having teeth protruding radially from the periphery thereof said teeth having cutting edges adapted to cut regardless of the direction of rotation, the diameter of the respective cutter elements being longer than the diameter of the respective spacer-cutter elements, the cutters and spacer-cutters being arranged so that there is a minimum of space between the respective elements when in an overlapping arrangement, said first and second shafts being disposed between an upper and a lower housing;

(c) bearing means for facilitating the rotation of said shafts in said housings;

(d) fastening means for securing said housings to said casing; and (e) a drive means for rotating said first shaft.

10. The apparatus of claim 9 in which said first shaft has a gear attached to the upper region thereof and said second shaft also has a gear attached to the upper region thereof each of said gears having teeth thereon, positioned and adapted to mesh with the teeth on the other gear, whereby the rotation of the first shaft causes simultaneous rotation of the second shaft.

11. The apparatus of claim 10 in which the number of teeth on one said gear is different from the number of teeth on the other said gear whereby said shafts rotate at different rates.

12. The apparatus of claim 9 in which said driving means is an electric motor.

13. The apparatus of claim 12 in which the said motor is adapted to reverse direction of rotation when the number of amps required to drive the said motor reaches a preset limit.

14. The apparatus of claim 13 in which the said motor is automatically turned off when the present number of amps has been reached a preset number of times.

15. Apparatus for comminuting solid waste material comprising:

(a) a casing defining therein a comminution compartment with inlet and outlet ports disposed on opposite sides of said comminution compartment and adapted for the flow of solid waste therethrough;

(b) a first shaft and a second shaft, said shafts being substantially parallel to each other and positioned in said comminution compartment;

(c) an arrangement of cutters mounted on said first shaft the cutters on said first shaft being adapted to be rotated upon the rotation of said first shaft upon its linear axis and said cutters on said first shaft being spaced from each adjacent cutter on the said first shaft;

(d) an arrangement of cutters mounted on said second shaft, the cutters on said second shaft being adapted to be rotated upon the rotation of said second shaft upon its linear axis and said cutters on said second shaft being spaced from each adjacent cutter on the said second shaft, the spacing of the cutters on the respective shafts being such that the cutters on one shaft can be intermeshed with the cutters on the other said shaft, with the spacing of said first shaft from said second shaft being appropriate to permit such intermeshing;

(e) an arrangement of spacer-cutters mounted between the respective cutters on the said two shafts, one spacer-cutter being positioned between each pair of adjacent cutters on each respective shaft, each spacer-cutter comprising a spacer means to provide the appropriate space between adjacent cutters to allow the intermeshing of a cutter from the other said shaft arrangement and each spacer means having cutting means positioned on the periphery of said spacer means;

(f) the said cutters on both shafts comprising discs, each said disc having teeth protruding radially from the outer periphery of said disc, said teeth having cutting edges thereon, the said spacer-cutters also comprising discs but each said spacer-cutter disc having a diameter shorter than the diameter of said cutter discs and each said disc of said spacer-cutter having teeth protruding radially from the outer periphery of said disc, said teeth having cutting edges thereon, each said tooth on said cutters and on said spacer-cutters being capable of cutting regardless of the direction of rotation of the said cutters and or said spacer-cutters;

(g) a pair of meshing gears, the first of said gears being affixed to said first shaft and the second of said gears being affixed to said second shaft, said gears being adapted to apply a rotational direction to said second shaft different from the direction of rotation of said first shaft; and (h) a driving means for providing rotational force to said first shaft; in which said arrangements of cutters and spacer-cutters on said first and second shafts are arranged continuously from one linear end to the other linear end of each said arrangement whereby there are no spaces free of cutters in the length of each said arrangement on which spaces strings can avoid being cut and be wound.

16. The apparatus of claim 15 in which said meshing gears have a different number of teeth in the respective gears whereby the said first shaft and said second shaft are rotated at different rates of speed.

17. The apparatus of claim 16 in which said driving means is an electric motor.

18. The apparatus of claim 17 in which the said motor is adapted to reverse direction of rotation when the number of amps required to drive the said motor reaches a preset limit.

19. The apparatus of claim 18 in which the said motor is automatically turned off when the preset number of amps has been reached a preset number of times.

20. The apparatus of claim 1 in which the said cutters mounted on said first and second shafts are individually combined with an adjacent unit of said spacer-cutters also mounted on said first and second shafts to form an integral unit of cutter—spacer-cutter.

21. The apparatus of claim 9 in which the said cutters mounted on said first and second shafts are individually combined with an adjacent unit of said spacer-cutters also mounted on said first and second shafts to form an integral unit of cutter—spacer-cutter.

22. The apparatus of claim 15 in which the said cutters mounted on said first and second shafts are individually combined with an adjacent unit of said spacer-cutters also mounted on said first and second shafts to form an integral unit of cutter—spacer-cutter.

23. Apparatus for comminuting tires comprising:
(a) a comminuting means;
(b) a conveying means for conveying said tires to said comminuting means;
(c) a casing defining therein a comminution compartment with said comminuting means therein with inlet and outlet ports disposed on opposite sides of said comminution compartment and adapted for the admission of tires thereinto and for the exit of comminuted tire particles therefrom;
(d) a first shaft and a second shaft, said first and second shafts each having an upper region and said shafts being substantially parallel to each other and positioned in said comminution compartment;
(e) an arrangement of cutters mounted on said first shaft the cutters on said first shaft being adapted to be rotated upon the rotation of said first shaft upon its linear axis and said cutters on said first shaft being spaced from each adjacent cutter on the said first shaft;
(f) an arrangement of cutters mounted on said second shaft, the cutters on said second shaft being adapted to be rotated upon the rotation of said second shaft upon its linear axis and said Cutters on said second shaft being spaced from each adjacent cutter on the said second shaft, the spacing of the cutters on the respective shafts being such that the cutters on one shaft can be overlapped with the cutters on the other said shaft, with the spacing of said first shaft from said second shaft being appropriate to permit such overlapping;
(g) an arrangement of spacer-cutters mounted between the respective cutters on the said two shafts, one spacer-cutter being positioned between each pair of adjacent cutters on each respective shaft, each spacer-cutter comprising a spacer means to provide the appropriate space between adjacent cutters to allow the overlapping of a cutter in one said cutter arrangement with a cutter in the other said shaft arrangement and each spacer means having cutting means positioned on the periphery of said spacer means;
(h) the said cutters and said spacer-cutters each having cutting means thereon which is capable of cutting regardless of the direction of rotation of the said cutters or said spacer-cutters; and
(i) a driving means for providing rotational force to said first shaft and said second shaft, said second shaft being driven in a direction opposite to the rotational direction of said first shaft.

24. The apparatus of claim 23 in which said arrangements of cutters and spacer-cutters on said first and second shafts are arranged continuously from one linear end to the other linear end of each said arrangement whereby there are no spaces free of cutters in the length of each said arrangement on which spaces strings can be wound.

25. The apparatus of claim 23 in which said conveying means comprises in part a first series of rollers on which each individual tire, having two sidewall sides and a tread surface, is initially partially positioned, said first series of rollers having a first end and a second end, said second end being positioned adjacent to said cutters and said first end being positioned a distance from said cutters, the rollers at said first end being arranged horizontally and the rollers at said second end being arranged vertically with the respective rollers between said first end and said second end changing gradually from horizontal to vertical positioning, whereby a tire being initially carried on its sidewall side on said conveying means riding partially on the horizontal rollers at said first end is turned gradually from resting on a sidewall side to resting on its tread surface as the tire reaches said cutters.

26. The apparatus of claim 25 in which said conveying system has a second series of rollers spaced from and substantially in a line parallel with said first series of rollers, said second series of rollers having a first end and a second end, said second end of said second series of rollers being positioned adjacent to said cutters and said first end of said second series of rollers being positioned a distance from said cutters, each of the rollers in said second series of rollers is arranged vertically whereby each tire on said conveying means as it is turned gradually from resting on a sidewall side to its tread surface is prevented from sliding off the conveying means by contact with the vertically arranged rollers of said second series of rollers.

27. The apparatus of claim 26 in which said conveying means has a third series of rollers positioned between said first and second series of rollers, said third series of rollers having a first end and a second end, said second end of said third series of rollers being positioned adjacent to said cutters and said first end of said third series of rollers being positioned a distance from said cutters, each of the individual rollers in said third series of rollers is arranged horizontally with the rollers of said third series at the first end of said third series of rollers are at the same horizontal level as the rollers at the first end of said first series of rollers whereby a tire placed on said conveying means on a sidewall side of said tire rests partially on said horizontal rollers at said first end of said third series of rollers and partially on said horizontal rollers at said first end of said first series of rollers.

28. The apparatus of claim 27 in which said horizontal rollers at the first end of said third series of rollers have a length in the individual rollers no greater than three-fourths of the diameter of the tires to be conveyed thereon and that the length of the individual rollers in the third series of rollers at the second end of said series is not substantially greater than the width of tread of the largest tires to be conveyed thereon.

29. The apparatus of claim 27 in which said first end of said third series of rollers in a raised position with respect to said second end of said third series of rollers whereby movement of the tires on said third series of rollers is effected by the force of gravity.

* * * * *